(12) United States Patent
Smith et al.

(10) Patent No.: US 9,491,316 B2
(45) Date of Patent: Nov. 8, 2016

(54) METHODS AND APPARATUS FOR DELIVERING DOCUMENTS

(75) Inventors: Philip J. Smith, Beecher, IL (US); Michael F. Curiel, Crown Point, IN (US); Jason R. Woods, Tinley Park, IL (US); Robert S. Gallagher, New Lenox, IL (US); Ronald A. Stimson, Jr., Milford, IL (US)

(73) Assignee: APPLIED SYSTEMS, INC., University Park, IL (US)

( * ) Notice: Subject to any disclaimer, the term of this patent is extended or adjusted under 35 U.S.C. 154(b) by 683 days.

(21) Appl. No.: 12/207,425

(22) Filed: Sep. 9, 2008

(65) Prior Publication Data

US 2010/0060926 A1    Mar. 11, 2010

(51) Int. Cl.
*H04N 1/00* (2006.01)
*H04N 1/327* (2006.01)
*G06F 3/12* (2006.01)

(52) U.S. Cl.
CPC ...... *H04N 1/00127* (2013.01); *H04N 1/32704* (2013.01); *G06F 3/1293* (2013.01); *H04N 2201/0093* (2013.01)

(58) Field of Classification Search
CPC .................. H04N 1/32704; H04N 1/00127; G06F 3/1293
USPC ........ 358/1.15, 402, 403, 405; 709/203, 238
See application file for complete search history.

(56) References Cited

U.S. PATENT DOCUMENTS

| | | |
|---|---|---|
| 2,974,306 A | 3/1961 | Femmer |
| 5,363,214 A | 11/1994 | Johnson |

(Continued)

FOREIGN PATENT DOCUMENTS

| | | |
|---|---|---|
| EP | 0503207 | 9/1992 |
| EP | 0550234 | 7/1993 |

(Continued)

OTHER PUBLICATIONS

Adl-Tabatabai, Ali-Reza; â€œcelrrevocable transactions and their applications,â€ • ACM Symposium on Parallel Algorithms and Architectures, Proceedings of the twentieth annual symposium on Parallelism in algorithms and architectures, Munich, Germany, Session: Special track—STM design and locks, pp. 285-296, 2008.

(Continued)

*Primary Examiner* — Jamares Q Washington
(74) *Attorney, Agent, or Firm* — K&L Gates LLP

(57) ABSTRACT

The present disclosure provides methods and apparatus for delivering documents. A web based application server transmits a document to a distribution management system. The distribution management system then translates the document if necessary (e.g., from a spreadsheet to a PDF and a fax) and sends the translated document to one or more destinations such as email inboxes, printers, and fax machines. For fax deliveries, the distribution management system sends the document to a particular client device that is associated with the fax destination. For example, the client device that actually transmits the fax may reside at a company, and the fax machine may be at a customer of that company. In this manner, fax transmissions appear to come from the correct source (not the distribution management system), and transmission charges associated with the fax are incurred by the appropriate company (not the company associated with the distribution management system).

36 Claims, 3 Drawing Sheets

(56) References Cited

U.S. PATENT DOCUMENTS

| | | | |
|---|---|---|---|
| 5,563,999 A | | 10/1996 | Yaksich |
| 5,682,460 A | * | 10/1997 | Hyziak .................. G06F 13/36 707/999.104 |
| 5,694,610 A | | 12/1997 | Habib |
| 6,081,588 A | * | 6/2000 | Ranalli et al. ........... 379/100.09 |
| 6,094,684 A | | 7/2000 | Plmann |
| 6,237,030 B1 | | 5/2001 | Adams |
| 6,334,145 B1 | | 12/2001 | Adams |
| 6,728,762 B1 | | 4/2004 | Estrada |
| 6,748,425 B1 | | 6/2004 | Duffy |
| 7,224,491 B2 | * | 5/2007 | Shinchi et al. ............... 358/400 |
| 7,281,049 B2 | * | 10/2007 | Verma et al. ................. 709/229 |
| 5,875,334 A | | 4/2008 | Kim |
| 2001/0051976 A1 | | 12/2001 | Mohri |
| 2002/0069254 A1 | * | 6/2002 | Watanabe et al. ............ 709/206 |
| 2002/0091782 A1 | * | 7/2002 | Benninghoff, III ........... 709/206 |
| 2002/0156853 A1 | * | 10/2002 | Hyakutake et al. .......... 709/206 |
| 2003/0093556 A1 | | 5/2003 | Yeung |
| 2003/0158842 A1 | | 8/2003 | Levy |
| 2003/0182438 A1 | | 9/2003 | Tenenbaum |
| 2003/0197744 A1 | | 10/2003 | Irvine |
| 2004/0003005 A1 | | 1/2004 | Chaudhuri |
| 2004/0003121 A1 | | 1/2004 | Tanimoto |
| 2004/0122774 A1 | * | 6/2004 | Studd et al. .................... 705/65 |
| 2004/0190074 A1 | | 9/2004 | Kato |
| 2005/0181790 A1 | | 8/2005 | Yach |
| 2005/0270558 A1 | * | 12/2005 | Konsella ............. H04L 12/5835 358/1.15 |
| 2007/0180144 A1 | | 8/2007 | Basu |
| 2007/0203890 A1 | | 8/2007 | Sareen |
| 2008/0082682 A1 | | 4/2008 | Kim |
| 2008/0126513 A1 | | 5/2008 | Bouchard |

FOREIGN PATENT DOCUMENTS

| | | |
|---|---|---|
| EP | 1564657 | 8/2005 |
| EP | 1604503 | 12/2005 |
| WO | 9926175 | 5/1999 |

OTHER PUBLICATIONS

Atiquzzaman, Mohammed; "A survey of data replication techniques for mobile ad hoc network databases," The VLDB Journal, The International Journal on Very Large Data Bases, vol. 17, Issue 5 (Aug. 2008), pp. 1143-1164, 2008.

Kaushik, Raghav; "Unraveling the duplicate-elimination problem in XML-to-SQL query translation," ACM International Conference Proceeding Series; vol. 67, Proceedings of the 7th International Workshop on the Web and Databases: colocated with ACM SIGMOD/PODS 2004, Paris, France, Session: Paper session 4: XML query processing, pp. 49-54, 2004.

Naumann, Felix; "Detecting duplicate objects in XML documents," Information Quality in Informational Systems, Proceedings of the 2004 international workshop on Information quality in information systems, Paris, France, Session: Data transformation and duplicate detection, pp. 10-19, 2004.

Fax@vantage Explained.

TAMOnline Frequently Asked Questions.

Printers accessed through Windows operating system; PDF drivers; Fax machines; Applied System Fax@vantage product; Applications allowing the output of documents using multiple output methods; Hosted Faxing solutions.

XF Rendering Server 2009, ecrion.software.

eFax, efax.com.

InterFAX, interfax.net.

International Search Report mailed Oct. 26, 2009 and International Preliminary Report on Patentability mailed on Mar. 24, 2011 for International Application No. PCT/US2009056370.

* cited by examiner

METHODS AND APPARATUS FOR DELIVERING DOCUMENTS

CROSS-REFERENCE TO RELATED APPLICATIONS

This application is related to the following co-pending commonly-owned patent applications: U.S. application Ser. No. 12/207,448 filed Sep. 9, 2008, entitled "METHOD AND APPARATUS FOR REMOTELY DISPLAYING SCREEN FILES AND EFFICIENTLY HANDLING REMOTE OPERATOR INPUT," currently pending; U.S. application Ser. No. 12/207,449 filed Sep. 9, 2008, entitled "METHOD, SYSTEM, AND APPARATUS FOR SCANNING AND IMPORTING DOCUMENTS," currently pending; U.S. application Ser. No. 12/207,442 filed Sep. 9, 2008, entitled "METHOD AND APPARATUS FOR DISPLAYING A MENU FOR ACCESSING HIERARCHICAL CONTENT DATA INCLUDING CACHING MULTIPLE MENU STATES," currently pending; and U.S. application Ser. No. 12/207,436 filed Sep. 9, 2008, entitled "METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE," currently pending; and U.S. application Ser. No. 12/207,454 filed Sep. 9, 2008, entitled "METHOD, SYSTEM, AND APPARATUS FOR SECURE DATA EDITING," currently pending, the entire contents of each of which is incorporated by reference herein.

TECHNICAL FIELD

The present application relates in general to delivering documents and more specifically to methods and apparatus for delivering documents such as fax documents via distribution management system.

BACKGROUND

Often, web based applications need to send documents to users. Typically, documents are sent via email and/or web download. Occasionally, web based application servers cause fax transmissions to occur. However, these server initiated fax transmissions suffer from certain drawbacks.

First, these fax transmissions appear to come from a central source (i.e., a fax number associated with the application server). However, if the server is providing a web based application used by multiple different companies, each of these companies may want their fax transmissions to appear to come from their company with their specific set of assigned phone numbers (e.g., the fax transmissions may be going to customers of the company).

Second, transmission charges associated with web based fax transmission are incurred by the company that owns the application server. This then creates additional overhead for the application server company and/or a billing burden for the application server company trying to recover these fax transmission fees.

SUMMARY

The present disclosure provides methods and apparatus for delivering documents via fax transmission that overcome these problems. A web based application server transmits a document to a distribution management system. The distribution management system then translates the document if necessary (e.g., from a proprietary format to a PDF and a fax) and sends the translated document to one or more destinations such as email inboxes, printers, and fax machines.

For fax deliveries, the distribution management system sends the document to a particular client device that is associated with the fax destination. For example, the client device that actually transmits the fax may reside at a company, and the fax machine may be at a customer of that company. In this manner, fax transmissions appear to come from the correct source (not the distribution management system), and transmission charges associated with the fax are incurred by the appropriate company (not the company associated with the distribution management system).

DETAILED DESCRIPTION

Figure 1:
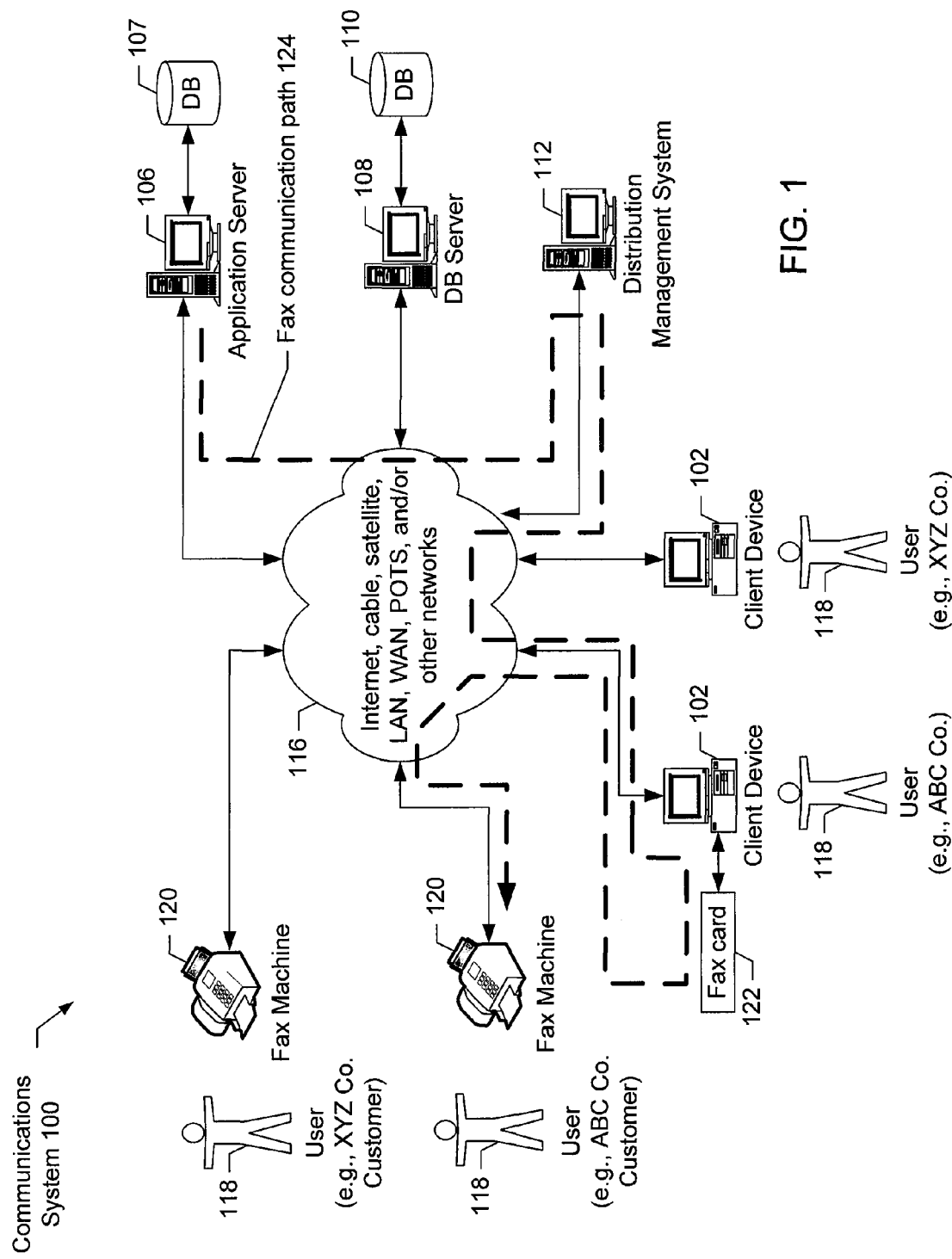
FIG. 1 is a high level block diagram of an example communications system.

The present system is most readily realized in a network communications system. A high level block diagram of an exemplary network communications system 100 is illustrated in FIG. 1. The illustrated system 100 includes one or more client devices 102, one or more application servers 106, one or more database servers 108 connected to one or more databases 110, a distribution management system 112, and one or more fax machines 120. As described in more detail below, each of these devices may communicate with each other via a connection to one or more communications channels 116. The communications channels 116 may be any suitable communications channels 116 such as the Internet, cable, satellite, local area network, wide area networks, telephone networks, etc. It will be appreciated that any of the devices described herein may be directly connected to each other and/or connected over one or more networks.

Figure 2:
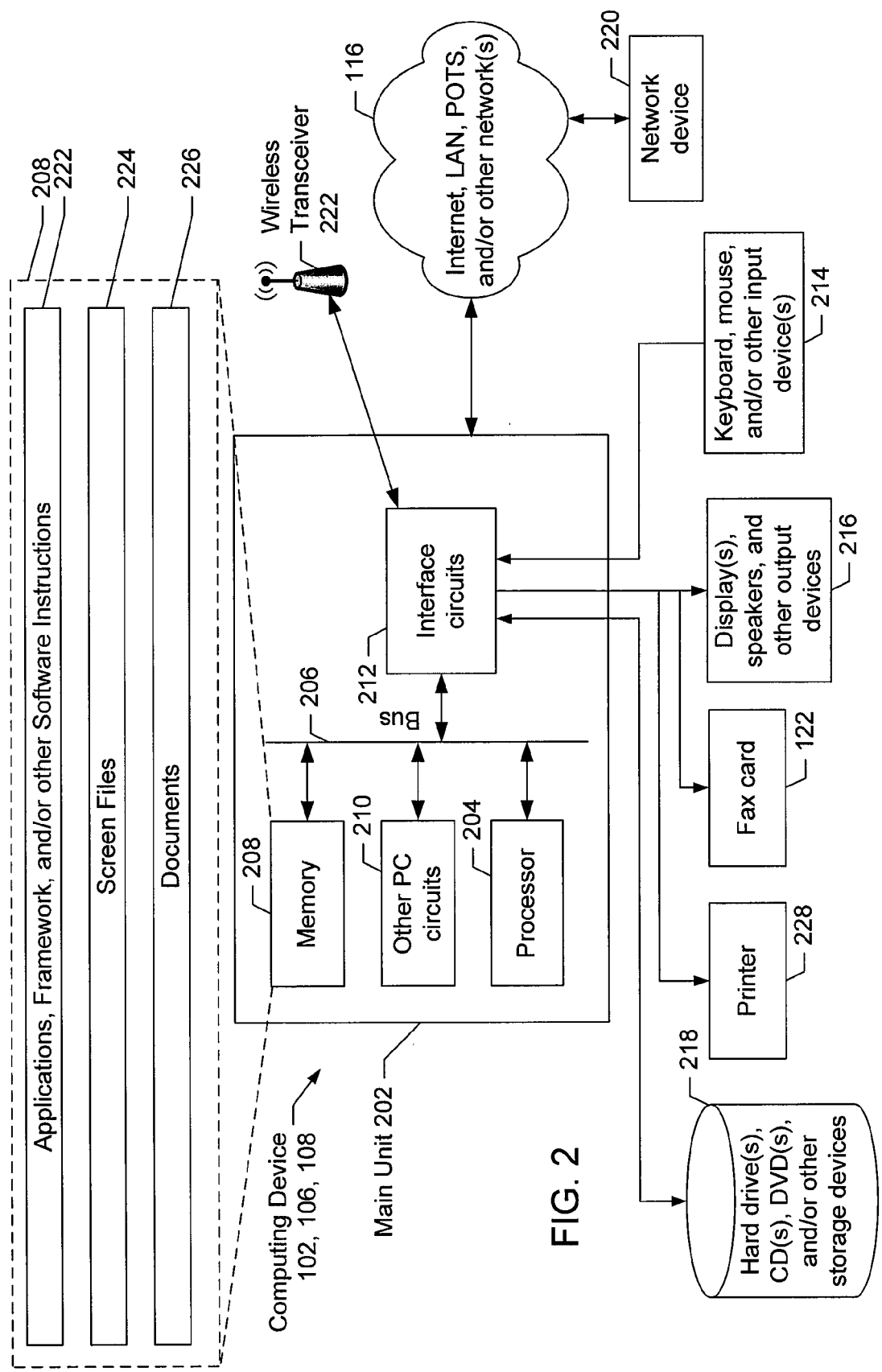
FIG. 2 is a more detailed block diagram showing one example of a computing device.

A detailed block diagram of an example computing device 102, 106, 108 is illustrated in FIG. 2. Each computing device 102, 106, 108 may include a server, a personal computer (PC), a personal digital assistant (PDA), and/or any other suitable computing device. Each computing device 102, 106, 108 preferably includes a main unit 202 which preferably includes one or more processors 204 electrically coupled by an address/data bus 206 to one or more memory devices 208, other computer circuitry 210, and one or more interface circuits 212. The processor 204 may be any suitable microprocessor.

The memory 208 preferably includes volatile memory and non-volatile memory. Preferably, the memory 208 and/or another storage device 218 stores software instructions 222 that interact with the other devices in the system 100 as described herein. These software instructions 222 may be executed by the processor 204 in any suitable manner. The memory 208 and/or another storage device 218 may also store one or more data structures, digital data indicative of documents, files, programs, web pages, etc. retrieved from another computing device 102, 106, 108 and/or loaded via an input device 214.

The example memory device 208 stores software instructions 222, screen files 224, and documents 226 for use by the system as described in detail below. It will be appreciated that many other data fields and records may be stored in the memory device 208 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, speakers, and/or other output devices 216 may also be connected to the main unit 202 via the interface circuit 212. The display may be a cathode ray tube (CRTs), liquid crystal displays (LCDs), or any other type of display. The display generates visual displays of data generated during operation of the computing device 102, 106, 108. For example, the display may be used to display screen files received from the application server 106. The visual displays may include prompts for human input, run time statistics, calculated values, data, etc.

One or more storage devices 218 may also be connected to the main unit 202 via the interface circuit 212. For example, a hard drive, CD drive, DVD drive, flash memory drive, and/or other storage devices may be connected to the main unit 202. The storage devices 218 may store any type of data used by the computing device 102, 106, 108.

Each computing device 102, 106, 108 may also exchange data with other computing devices 102, 106, 108 and/or other network devices 220 via a connection to the communication channel(s) 116. The communication channel(s) 116 may be any type of network connection, such as an Ethernet connection, WiFi, WiMax, digital subscriber line (DSL), telephone line, coaxial cable, etc. Users 118 of the system 100 may be required to register with the application server 106. In such an instance, each 118 user may choose a user identifier (e.g., e-mail address) and a password which may be required for the activation of services. The user identifier and password may be passed across the communication channel(s) 116 using encryption built into the user's browser, software application, or computing device 102, 106, 108. Alternatively, the user identifier and/or password may be assigned by the application server 106.

Figure 3:
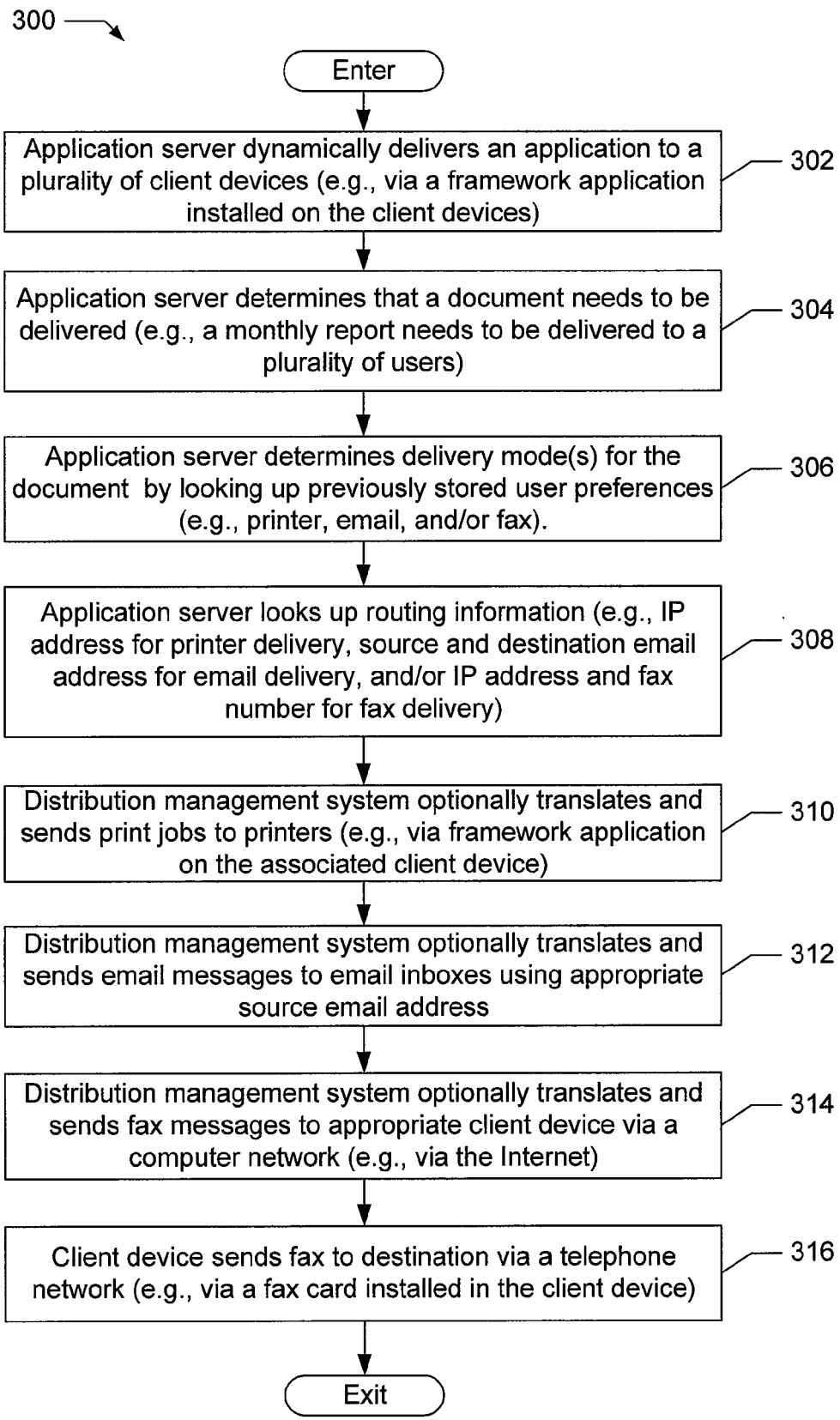
FIG. 3 is a flowchart showing one example of a system for delivering documents.

A flowchart of an example process 300 for delivering documents is presented in FIG. 3. Preferably, the process 300 is embodied in one or more software programs which are stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, some of the steps described may be optional, and additional steps may be included.

In general, the process 300 causes an application server 106 to transmit a document to the distribution management system 112. The distribution management system 112 then translates the document if necessary. For example, the distribution management system 112 may translate the document to and/or from a proprietary format, a spreadsheet format, a delimited format such as a comma separated values (CSV) format, a word processing format, a PDF format, and/or a fax format). The distribution management system 112 then sends the document and/or the translated document to one or more destinations such as email inboxes, printers, and fax machines 120. For fax deliveries, the distribution management system 112 sends the document to a particular client device 102 that is associated with the fax destination. For example, the client device 102 that actually transmits the fax may reside at a company, and the fax machine 120 may be at a customer of that company. In this manner, fax transmissions appear to come from the correct source (not the distribution management system 112), and transmission charges associated with the fax are incurred by the appropriate company (not the company associated with the distribution management system 112).

More specifically, the application server 106 begins the example process 300 by dynamically delivering an application to a plurality of client devices (block 302). Preferably, the application server 106 may transmit data indicative of screen displays to a framework application running on the client device 102. For example, the application server 106 may transmit data indicative of screen displays for an insurance agency application to the client device 102. In response to users 118 at the client devices 102, the application server 106 receives events and data from the framework applications running on the client devices 102. For example, a user 118 may click a mouse on a drop down menu at the client device 102. As a result, the client device 102 sends an event to the application server 106. The application server 106 then responds to the client device 102 with data to populate the drop down menu. If the user 118 selects an item from the drop down menu, the client device 102 sends data indicative that selection to the application server 106. In this back-and-forth manner, the business logic of one or more applications is delivered from the application server 106 to the client devices 102.

When executing these applications, the application server 106 may retrieve data from a local database 107 and/or a remote database 110 via a database server 108. For example, the application server 106 may retrieve the data to populate the drop down menu in the example above. In another example, the application server 106 may store data entered by a user 118 in a database 107, 110 for later retrieval and display at a client device 102.

Often, the application server 106 may need to send one or more documents to a plurality of users 118 (block 304). For example, the application server 106 may need to send a monthly report to several different users 188. Next, the distribution management system 112 determines one or more delivery modes for the document by looking up previously stored user preferences (block 306) and looks up any necessary routing information (block 308).

Some users 118 may want to have the report delivered directly to their local printer 228. Accordingly, the distribution management system 112 sends the print job directly to the associated client device 102 (block 310). The distribution management system 112 is given access to each user's printers via the framework application running on that user's client device 102.

Some users 118 may want to have the report delivered via email and/or to a fax machine 120. Preferably, one distribution management system 112 is used by multiple companies (e.g., hundreds). For example, the application server 106 may be serving a software application used by ABC Co. and XYZ Co. Each of these companies may need to send documents to their customers. For example, ABC Co. may need to send a monthly report to ABC Co. Customer, and XYZ Co. may need to send a monthly report to XYZ Co. Customer.

Preferably, communications from the distribution management system 112 to a customer should appear to come from the company associated with that customer, not from the distribution management system 112. Accordingly, emails are sent to directly to users 118 from the distribution management system 112 via the network 116 using an "from" email address indicative of the company associated with the customer (block 312). However, to prevent the email from being captured by a spam filter, the email address is not spoofed. For example, the sender's email address may be documents_for_abc@dms.com for documents that need to appear to come from ABC Co. and documents_for_xyz@dms.com for documents that need to appear to come from XYZ Co. In other words, the example email messages are actually being sent from the "dms.com" domain. However, the full email address of the sender changes depending on the destination.

In addition, the "reply" email address changes depending on the destination. However, in this case, spam filters are generally not an issue. Therefore, the reply email address is set to the actual companies email address. For example, the reply email address may be user@abc.com for documents that need to appear to come from ABC Co. and user@xyz.com for documents that need to appear to come from XYZ Co.

In order to make faxes of documents appear to come from the company associated with a customer, the distribution management system 112 routes faxes through a fax card 122 in a client device 102 of the company (blocks 314 and 316). The distribution management system 112 is given access to each user's fax card (if installed) via the framework application running on that user's client device 102. Preferably, the framework application is downloaded from the application server 106 and installed on the client device 102.

An example of a complete fax communication path 124 is illustrated in FIG. 1. In this example, the application server 106 sends the document to the distribution management system 112 via the Internet. As an example, this document may be a monthly report in a proprietary format or a word processing format. If necessary, the distribution management system 112 then converts the document. For example, the distribution management system 112 may convert the proprietary file to a PDF for delivery to a printer and/or an email inbox, and the distribution management system 112 may convert the proprietary file to a fax document for delivery to a fax machine. The distribution management system 112 then sends the document and/or translated document to the appropriate client device 102 via the Internet. Once the document is received by the client device 102, the client device 102 faxes the document to the destination fax machine via an installed fax card 122 and a telephone network. In this manner, ABC Co. is the source of the fax transmission and incurs the associated fax charges.

In summary, persons of ordinary skill in the art will readily appreciate that methods and apparatus for delivering documents have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. A method of delivering a document, the method comprising:
    associating data indicative of a first fax machine with a first network address of a first computing device that resides at a first company;
    associating data indicative of a second different fax machine with a second different network address of a second different computing device that resides at a second company, which is different from the first company;
    responsive to receiving a client inquiry, providing data to populate a list of options configured to be selected by a user;
    determining that the document is to be faxed to a destination based on a user selection of at least one of the options by the user, the destination being one of the first fax machine and the second fax machine;
    performing a look-up of previously stored user preferences to determine a delivery mode to deliver the document to the destination, which is different from the first company and different from the second company;
    determining a selected computing device residing at a selected company by selecting one of the first computing device residing at the first company and the second computing device residing at the second company based on the destination and the delivery mode;
    transmitting first data indicative of the document from a server to the selected computing device residing at the selected company via a computer network; and
    faxing the document from the selected computing device residing at the selected company to the destination via a telephone network such that the selected company is the source of the faxed document.

2. The method of claim 1, further comprising translating a file storing the document from a first file format to a second different file format.

3. The method of claim 2, wherein the first file format includes a proprietary file format and the second file format includes a portable document file (PDF) format.

4. The method of claim 2, wherein the first file format includes a proprietary file format and the second file format includes a facsimile file format.

5. The method of claim 2, wherein the first file format includes a proprietary file format and the second file format includes a word processing file format.

6. The method of claim 2, wherein the first file format includes a proprietary file format and the second file format includes a spreadsheet file format.

7. The method of claim 2, wherein the first file format includes a proprietary file format and the second file format includes a comma separated vales (CSV) file format.

8. The method of claim 2, wherein the first file format includes a first proprietary file format and the second file format includes a second different proprietary file format.

9. The method of claim 1, wherein transmitting first data indicative of the document includes transmitting first data to a framework application on a client device.

10. The method of claim 1, wherein the network address includes an Internet Protocol (IP) address.

11. The method of claim 1, wherein the computer network includes the Internet.

12. The method of claim 1, wherein the data indicative of the first fax machine includes a fax number.

13. The method of claim 1, wherein determining that the document is to be faxed to the destination includes determining that a period of time has expired.

14. The method of claim 1, further comprising transmitting third data indicative of the document to a printer.

15. The method of claim 14, wherein the third data is in a proprietary format.

16. The method of claim 14, wherein transmitting the third data indicative of the document to the printer includes transmitting the third data to a framework application on a client device.

17. The method of claim 1, further comprising transmitting third data indicative of the document to an email inbox using a source email address selected based on the destination.

18. An apparatus for transmitting a document, the apparatus comprising:
a processor;
a network connection operatively coupled to the processor; and
a storage device operatively coupled to the processor, the storage device storing a software program structured to cause the processor to:
associate data indicative of a first fax machine with a first network address of a first computing device that resides at a first company;
associate data indicative of a second different fax machine with a second different network address of a second different computing device that resides at a second company, which is different from the first company;
responsive to receiving a client inquiry, provide data to populate a list of options configured to be selected by a user;
determine that the document is to be faxed to a destination based on a user selection of at least one of the options by the user, the destination being one of the first fax machine and the second fax machine;
perform a look-up of previously stored user preferences to determine a delivery mode to deliver the document to the destination, which is different from the first company and different from the second company;
determine a selected computing device residing at a selected company by selecting one of the first computing device residing at the first company and the second computing device residing at the second company based on the destination and the delivery mode; and
transmit first data indicative of the document from a server to the selected computing device residing at the selected company via a computer network in order to cause the selected computing device to fax the document from the selected computing device residing at the selected company to the destination via a telephone network such that the selected company is the source of the faxed document.

19. The apparatus of claim 18, wherein the software program is structured to cause the processor to translate a file storing the document from a first file format to a second different file format.

20. The apparatus of claim 19, wherein (i) the first file format includes at least one of a spreadsheet file format and a word processing file format, and (ii) the second file format includes at least one of a portable document file (PDF) format and a facsimile file format.

21. The apparatus of claim 18, wherein the data indicative of the first fax machine includes a fax number.

22. The apparatus of claim 18, wherein determining that the document is to be faxed to the destination includes determining that a period of time has expired.

23. The apparatus of claim 18, wherein the software program is structured to cause the processor to transmit third data indicative of the document to a printer via a framework application installed on a client device from the apparatus.

24. The apparatus of claim 18, wherein the software program is structured to cause the processor to transmit third data indicative of the document to an email inbox using a source email address selected based on the destination.

25. A non-transitory machine readable memory storing instructions structured to cause an apparatus to:
associate data indicative of a first fax machine with a first network address of a first computing device that resides at a first company;
associate data indicative of a second different fax machine with a second different network address of a second different computing device that resides at a second company, which is different from the first company;
responsive to receiving a client inquiry, provide data to populate a list of options configured to be selected by a user;
determine that the document is to be faxed to a destination based on a user selection of at least one of the options by the user, the destination being one of the first fax machine and the second fax machine;
perform a look-up of previously stored user preferences to determine a delivery mode to deliver the document to the destination, which is different from the first company and different from the second company;
determine a selected computing device residing at a selected company by selecting one of the first computing device residing at the first company and the second computing device residing at the second company based on the destination and the delivery mode; and
transmit first data indicative of the document from a server to the selected computing device residing at the selected company via a computer network in order to cause the selected computing device residing at the selected company to fax the document from the selected computing device to the destination via a telephone network such that the selected company is the source of the faxed document.

26. The non-transitory machine readable memory of claim 25, wherein the instructions are structured to cause the apparatus to translate a file storing the document from a first file format to a second different file format.

27. The non-transitory machine readable memory of claim 26, wherein (i) the first file format includes at least one of a spreadsheet file format and a word processing file format, and (ii) the second file format includes at least one of a portable document file (PDF) format and a facsimile file format.

28. The non-transitory machine readable memory of claim 25, wherein the data indicative of the first fax machine includes a fax number.

29. The non-transitory machine readable memory of claim 25, wherein determining that the document is to be faxed to the destination includes determining that a period of time has expired.

30. The non-transitory machine readable memory of claim 25, wherein the instructions are structured to cause the apparatus to transmit third data indicative of the document to a printer via a framework application installed on a client device from the apparatus.

31. The non-transitory machine readable memory of claim 25, wherein the instructions are structured to cause the apparatus to transmit third data indicative of the document to an email inbox using a source email address selected based on the destination.

32. The method of claim 1, wherein the network address uniquely identifies a computing device.

33. The method of claim 1, wherein the network address uniquely identifies a network device.

34. The method of claim 1, wherein the network address identifies at least one of a computing device and a network device.

35. The method of claim 17, wherein the user chooses an email address and a password, and the email address uniquely identifies the user.

36. The method of claim 17, wherein the user can access the document in the email inbox from computing devices that have different network addresses.

\* \* \* \* \*